Jan. 19, 1971  R. C. HILL ET AL  3,556,858
CONTROL APPARATUS
Filed Sept. 11, 1968
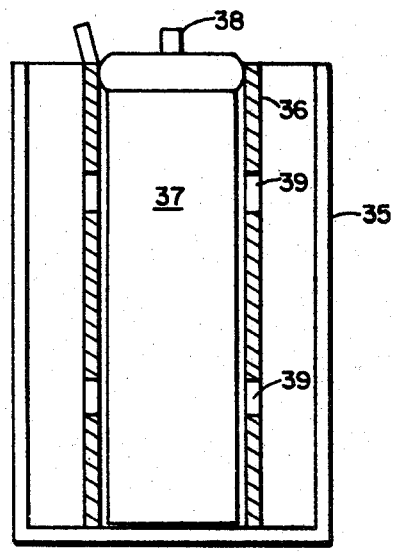
FIG. I
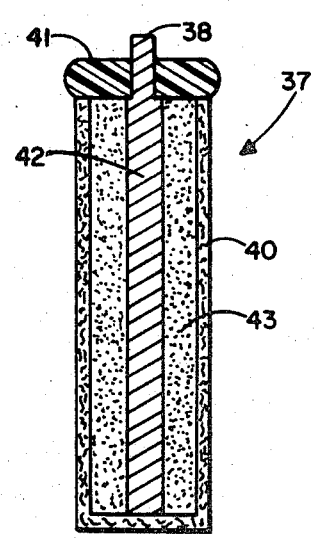
FIG. 2
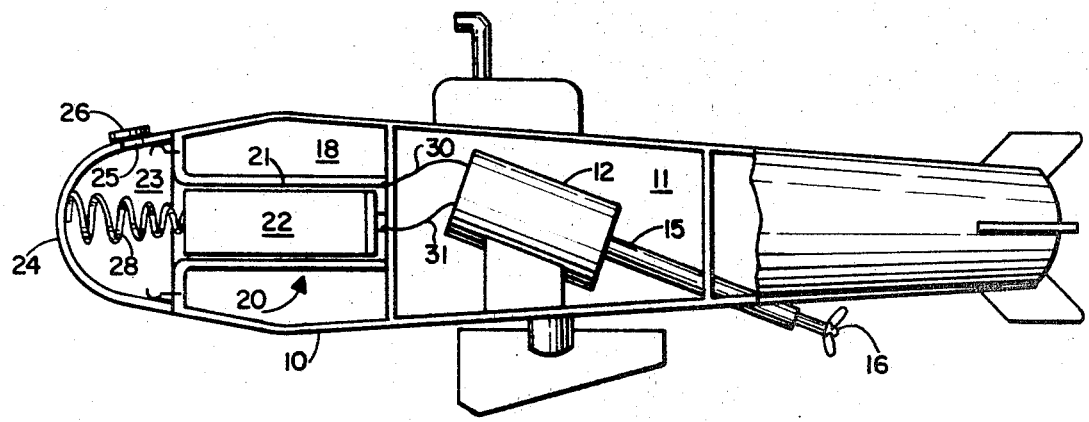
FIG. 3
INVENTORS
RICHARD C. HILL
MICHAEL J. POLLACK
BY
Alvin Medwed
ATTORNEY __United States Patent Office__

3,556,858
Patented Jan. 19, 1971

3,556,858
CONTROL APPARATUS
Richard C. Hill, Glenside, and Michael J. Pollack, Lansdale, Pa., assignors to Honeywell, Inc., Minneapolis, Minn., a corporation of Delaware
Filed Sept. 11, 1968, Ser. No. 759,024
Int. Cl. H01m 17/00
U.S. Cl. 136—100                                    11 Claims

ABSTRACT OF THE DISCLOSURE

A replenishable electric-current producing cell, or battery of cells, wherein the components which are depleted through use of the cell are packaged in a replaceable unit. The materials of which the cell is made are nontoxic in nature and nonhazardous for use by children. Also, a device embodying, as an integral part thereof, an electric-current producing cell with the replenishable feature.

BRIEF SUMMARY OF THE INVENTION

The present invention pertains to electric-current producing devices and apparatus for use therewith. In particular, the present invention pertains to electrochemical cells or batteries with toys or other such products wherein through extended use, frequent replacement or replenishment is required. Additionally, it is intended that the electric-current producing device according to the present invention be constructed of substances and materials which are nontoxic and nonhazardous for use by children.

One of the most objectionable aspects of the battery driven toys on the market today is the short life of the batteries, making necessary frequent replacement resulting in substantial expense. In accordance with the present invention, the operating cost is minimized by providing that only those portions of the current-producing devices be replaced which through use and with passing of time are wasted and become exhausted.

In a primary cell the chemical action eats away one of the electrodes. When this happens in a dry cell, the cell must be thrown away. Clearly, however if it were possible to replace the spent electrode, as well as other materials which may be depleted through use, the life of the cell could be extended substantially. Heretofore this was not practical for a number of reasons. First, it was felt that the savings made possible by replacement of spent components were not substantial enough to compensate for the inconvenience to the user of the battery. Secondly, the chemical composition of the present-day batteries is in most cases very toxic and not safe for handling by the inexperienced. Certainly, the dangers of injury which many of the chemicals used pose to the user make such chemicals too hazardous for use by children.

The present invention overcomes both of the above objections. It negatives the first objection by unique battery structure and unique packaging of a replaceable unit, making replenishment of the cells little or no more difficult and inconvenient than a replacement of the entire cell. The second objection is overcome by development of completely new battery chemistry based on nontoxic, nonhazardous substances. Not only does our invention offer economic advantages, but it also possesses substantial recreational a well as educational value.

It is therefore an object of the present invention to provide a replenishable electric-current producing cell.

A further object of the present invention is to provide an electric-current producing cell which is nontoxic in nature.

A still further object of the present invention is to provide an electrically-operated device with a replenishable nontoxic current-producing cell.

These and further objects will become apparent to those skilled in the art upon examination of the following specification, claims and drawings.

BRIEF DESCRIPTION OF THE DRAWING

FIG. 1 illustrates a cross section of an electric current-producing cell according to the present invention;

FIG. 2 shows a cross section of a replenishable member for use in a cell of FIG. 1; and FIG. 3 illustrates an electric-current driven toy according to the present invention, wherein the cell of the type shown in FIG. 1 is incorporated as an integral part of the toy.

DESCRIPTION OF THE PREFERRED EMBODIMENTS

The preferred embodiment of the present invention comprises a toy powered by electric current, wherein the current is derived from an electrochemical cell which is replenishable after discharge by replacement of the spent components. A cavity is provided in the toy housing which may be constructed of plastic or other appropriate material. The cavity portion of the toy is generally sealed so that it may serve as a container for a liquid electrolyte. In the preferred embodiment, the anode of the electrochemical cell is attached to the inside wall of the cavity and is not designed to be removed in the course of the normal operation of the toy. The remaining elements of the cell, however, are packaged in such a way that the resulting package is a replaceable unit which may be inserted into the toy cavity to energize the cell upon addition of a liquid solvent and may be removed when the cell is discharged, to be replaced by a new unit. The replaceable unit may comprise of a porous cup which also serves as a separator, and electrolyte salt deposited on said cup or placed within said cup, a cathode material, and a cathode collector with a connection for the external load. The other connection with the external load is made at the anode.

The concept for a toy battery with replaceable parts is made practical by development of new battery chemistry based on nontoxic materials. It would otherwise be too dangerous for use by children, for which market the present invention will be most applicable, although it is not limited thereto.

Special care must be exercised to select materials which are not excessively toxic and which do not react with the other components of the battery to produce toxic substances. For the purpose of this specification, the term "nontoxic" shall mean any substance which exhibits no more than moderate toxicity as defined and classified in the second edition of "Dangerous Properties of Industrial Materials," by N. Irving Sax, and published by the Reinhold Publishing Corporation.

The anode is a strongly electro-positive metal. The anode of the preferred embodiment of the electrochemical cell according to the present invention is made of magnesium.

In the preferred embodiment the cathode is selected from a group consisting of ferric citrate, ferric acetate, cobalt citrate, and cobalt acetate. It will be noted that all of the above cathode materials are nontoxic, in accordance with our definition set out above.

The electrolyte comprises a salt of a light metal such as KCl and/or $MgSO_4$ in a nontoxic solvent, preferably water. A porous separator is provided to physically separate the anode from the cathode.

A typical toy in accordance with the present invention is shown in FIG. 3. The toy body 10 is constructed of a durable material such as plastic and formed into a shape of a vehicle, or other appropriate toy design. In FIG. 3 the design is that of a toy submarine. Body 10 of the submarine is shown divided into at least two compartments. Compartment 11, located centrally, serves as a housing for an electric motor 12. Compartment 11 is sealed to prevent water from entering into contact with motor 12. The rotor of the motor is connected to a shaft 15, extending through the lower end, to the outside of the submarine. Shaft 15 carries a propeller 16 at the outer end for imparting motion to the submarine.

Towards the front end of the submarine is located a second compartment 18 for housing a current-producing cell 20. Cell 20 is comprised of an anode 21, a replaceable unit 22 and an electrolyte solvent 23. A removable cover 24 closes the front end of compartment 18. Cover 24 allows easy removal of replacement unit 22 when the cell becomes discharged. A filling hole 26 is also provided for filling compartment 18 with water or other appropriate electrolyte solvent. Replacement unit 22 is held in place by a spring member 28, positioned between cover 24 and unit 22. Electrical connections 30 and 31 connect the anode and the cathode of cell 20 to motor 12 through the wall separating compartments 18 and 11.

Clearly the embodiment of FIG. 3 is only a specific example of a broader concept, i.e., the integral structure of a replenishable *primary* battery and the toy or similar article of manufacture. Many variations and departures from the above description are possible and will be called for depending on the features of the particular item. For example, it was stated above that compartment 11 is sealed to prevent inflow of water into contact with motor 12. In a nonwater toy this problem does not exist. It may be, in fact, that electric current is not to be supplied to energize a motor, but may be supplied for other uses such as for operating electric lights.

The structure and operation of the battery portion of the toy will be more clearly understood by reference to FIGS. 1 and 2. In FIG. 1 the battery is shown with a cylindrical housing 35 which in FIG. 3 is part of the toy itself. Within housing 35 and attached to it is a cylindrical anode 36, positioned, concentrically and coaxially with housing 35. A replaceable unit 37 is positioned within the cylindrical opening in anode 36. The replaceable unit 37 has a terminal 38 for electrical connection. The other connection is made to anode 36. Ports 39 are provided in anode 36 to allow the flow of electrolyte solvent into contact with replaceable unit 37.

FIG. 2 shows in detail a cross-sectional view of replaceable unit 37. It is comprised of a porous cup 40, which serves as a container for cathode composition 43. A cathode collector 42, constructed of a conductive material such as stainless steel, is positioned centrally in cup 40 and extends through the top of the cup to serve at its outer end as a cell terminal 38. The cup is sealed at the top end by a cover 41.

Cup 40 serves, not only as a container for the cathode composition, but also as a cell separator. Furthermore, in the preferred embodiment, the electrolyte salt is deposited on the cup wall, within the porous interstices of the wall. Electrolyte salt may also be placed inside cup 40 with the cathode composition. When water or other solvent is added to the cell, the electrolyte salt dissolves to produce an electrolyte solution. As the salt dissolves, the interstices in the cup wall are opened and electrolytic connection between the anode and the cathode is made possible. Cup 40 may be made of plastic, paper, or other suitable material. It is a singularly unique feature of the present invention that the components which are most readily depleted through the use of the cell are packaged in a single removable unit, the replacement of which accomplishes a substantially complete restoration of the cell.

The following examples illustrate the preparation and operation of the nontoxic cells according to the present invention, but are not intended to limit the scope of the invention in any way.

EXAMPLE I

In this example a cell similar in construction to that of the cell shown in FIGS. 1 and 2 of the drawings is employed. The anode is constructed of magnesium, the separator is a porous plastic extraction cup which also serves as the container for the cathode material, the cathode material is ferric citrate, the electrolyte salt is potassium chloride and the electrolyte solvent is water. The cathode collector is constructed of stainless steel and is positioned centrically within the separator cup in intimate contact with the cathode material, as illustrated in FIG. 2.

Upon activation of the cell by adding the water solvent, the following voltage characteristics were observed under a constant 50 ma. current drain at room temperature:

| Time, mins | 0 | 10 | 20 | 30 | 40 | 50 | 60 |
|---|---|---|---|---|---|---|---|
| Volts | 1.9 | 1.9 | 1.7 | 1.6 | 1.5 | 1.2 | 1.0 |

EXAMPLE II

The cell of this example is similar to that of Example I and that shown in FIGS. 1 and 2, except that magnesium sulfate in place of potassium chloride is used as the electrolyte salt. Under a constant 50 ma. drain, the following voltage-time characteristics were obtained:

| Time, mins | 0 | 8 | 16 | 24 | 32 | 40 | 48 |
|---|---|---|---|---|---|---|---|
| Volts | 1.5 | 1.5 | 1.5 | 1.4 | 1.3 | 1.1 | .6 |

EXAMPLE III

In this example, as in Example I, magnesium is used as the anode and water is used as the solvent. The electrolyte salts are a combination of potassium chloride and magnesium sulfate in the ratio of 20 grams of magnesium sulfate and 10 grams of potassium chloride per hundred ml. of water. The material used as a cathode is ferric acetate. Under a 47-ohm load, the following voltage-time characteristics were observed:

| Time, mins | 0 | 10 | 20 | 30 | 38 | 45 |
|---|---|---|---|---|---|---|
| Volts | 1.7 | 1.6 | 1.5 | 1.4 | 1.2 | .0 |

EXAMPLE IV

The construction of the cell in this example is similar to that of Example III, except that cobalt acetate in place of ferric acetate is used as the cathode material. Under a 47-ohm load, the voltage-time characteristics obtained were as follows:

| Time, mins | 0 | 10 | 20 | 40 | 60 | 80 | 100 |
|---|---|---|---|---|---|---|---|
| Volts | 1.7 | 1.0 | .9 | .8 | .8 | .75 | .75 |

EXAMPLE V

The cell of this example is similar to the cell of Example IV, except that cobalt citrate in place of cobalt acetate is used as the cathode material. The cell constructed according to this example produced an open circuit voltage of 1.95 volts. Under a constant current drain of 60 ma., the voltage-time characteristics obtained were as follows:

| Time, mins | 0 | 10 | 20 | 30 | 40 | 50 | 60 | 7 |
|---|---|---|---|---|---|---|---|---|
| Volts | 1.6 | 1.45 | 1.41 | 1.35 | 1.21 | 1.15 | 1.05 | .7 |

While we have shown and described preferred embodiments of this invention, further modifications and improvements will occur to those skilled in the art. We desire it to be understood, therefore, that this invention is not limited to the particular form shown and described and we intend in the appended claims to cover all modifications that do not depart from the spirit and scope of this invention.

We claim:
1. A nontoxic primary cell comprising:
a case;
a magnesium anode;
a cathode selected from a group consisting of ferric citrate, ferric acetate, cobalt citrate and cobalt acetate;
a porous separator member interposed between said anode and said cathode; and
an electrolyte composition comprising an aqueous solution of a salt selected from a group consisting of potassium chloride and magnesium sulfate and mixtures of the two.

2. Apparatus according to claim 1, wherein said separator is in the shape of a porous cup and said cathode is positioned within said cup.

3. Apparatus according to claim 2, wherein a cathode collector is positioned within said cup in intimate contact with said cathode.

4. Apparatus according to claim 1, wherein the concentration of said electrolyte salts is approximately 10 grams of potassium chloride and 20 grams of magnesium sulfate per 100 ml. of water.

5. A replenishable nontoxic primary cell adapted to be activated by addition of electrolyte solvent, said cell having a permanent portion including a case and a magnesium anode mounted within said case and having a replaceable portion for insertion into said case, said replaceable portion including a cell separator, a cathode selected from the group consisting of ferric citrate, ferric acetate, cobalt citrate, and cobalt acetate and an electrolyte salt selected from the group consisting of potassium chloride and magnesium sulfate, and mixtures thereof.

6. A replaceable member for a replenishable primary cell adapted to be activated by addition of an electrolyte solvent and having a permanent portion including a cell case and a magnesium anode, said replaceable member being characterized by a unitary package comprising a cathode, a cell separator in the form of a porous container surrounding said cathode and an electrolyte salt, and wherein said cathode is selected from a group consisting of a ferric citrate, ferric acetate, cobalt citrate and cobalt acetate, and said electrolyte salt is selected from a group consisting of potassium chloride and magnesium sulfate and mixtures thereof.

7. A replaceable member for a replenishable primary cell adapted to be activated by addition of an electrolyte solvent, and having a permanent portion including a cell case and a magnesium anode, said replaceable member comprising:
a cup having porous walls to serve as a cell separator and as a package for the replaceable member;
electrolyte salt selected from a group consisting of magnesium sulfate and potassium chloride deposited on and permeating said porous wall of said cup;
a cathode selected from a group consisting of ferric citrate, ferric acetate, cobalt citrate and cobalt acetate, at least partially filling said cup; and
a cathode collector mounted within said cup in intimate contact with said cathode composition.

8. Apparatus according to claim 7 wherein said electrolyte salt is a composition comprising a combination of magnesium sulfate and potassium chloride.

9. A device operated by electric current, said device comprising:
a housing having a first and second compartment electric energy utilization means in said first compartment, said utilization means having an input for connection to a source of electric current, and having an output; said second compartment being sealed and adapted for containing a liquid electrolyte;
a magnesium anode mounted within said second compartment;
a replaceable member positioned within said second compartment, said replaceable member including a porous cup serving as a cell separator;
a cathode selected from a group consisting of ferric citrate, ferric acetate, cobalt citrate, and cobalt acetate positioned within said porous cup;
an electrolyte salt carried by said porous cup; and
means connecting said anode and cathode to the input of said electric energy utilization means, whereby the operation of said device is achieved by introduction of an electrolyte solvent into said cathode compartment.

10. A device according to claim 9 wherein said electrolyte salt carried by said porous cup is selected from a group consisting of magnesium sulfate and potassium chloride.

11. Apparatus according to claim 9 wherein said electrolyte salt carried by said porous cup is a combination of magnesium sulfate and potassium chloride.

References Cited

UNITED STATES PATENTS

| | | | |
|---|---|---|---|
| 1,438,084 | 12/1922 | Benner et al. | 136—113 |
| 1,501,091 | 7/1924 | Benner et al. | 136—114 |
| 719,752 | 2/1903 | Conrad | 136—101 |
| 1,865,004 | 6/1932 | Haring | 136—100 |
| 2,688,649 | 9/1954 | Bjoksten | 136—101 |
| 2,874,204 | 2/1959 | Morehouse et al. | 136—100M |
| 2,925,455 | 2/1960 | Eidensohn et al. | 136—100 |
| 2,976,342 | 3/1961 | Morehouse et al. | 136—100 |
| 3,260,620 | 7/1966 | Gruber | 136—83 |
| 3,418,171 | 12/1968 | Popat | 136—100 |

WINSTON A. DOUGLAS, Primary Examiner

C. F. LeFEVOUR, Assistant Examiner

U.S. Cl. X.R.

136—120, 155